United States Patent
Nakaya

(10) Patent No.: US 11,224,952 B2
(45) Date of Patent: Jan. 18, 2022

(54) MACHINE TOOL

(71) Applicants: CITIZEN WATCH CO., LTD., Nishitokyo (JP); CITIZEN MACHINERY CO., LTD., Nagano (JP)

(72) Inventor: Takaichi Nakaya, Higashimurayama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 66 days.

(21) Appl. No.: 16/648,230

(22) PCT Filed: Oct. 4, 2018

(86) PCT No.: PCT/JP2018/037284
§ 371 (c)(1),
(2) Date: Mar. 18, 2020

(87) PCT Pub. No.: WO2019/073907
PCT Pub. Date: Apr. 18, 2019

(65) Prior Publication Data
US 2020/0238465 A1 Jul. 30, 2020

(30) Foreign Application Priority Data

Oct. 13, 2017 (JP) .............................. JP2017-199695

(51) Int. Cl.
*B23Q 15/013* (2006.01)
*G05B 19/416* (2006.01)
(Continued)

(52) U.S. Cl.
CPC .......... *B23Q 15/013* (2013.01); *B23Q 17/12* (2013.01); *B23Q 17/22* (2013.01); *G05B 19/4093* (2013.01); *G05B 19/4163* (2013.01)

(58) Field of Classification Search
None
See application file for complete search history.

(56) References Cited

U.S. PATENT DOCUMENTS

2016/0266567 A1* 9/2016 Watanabe ............ B23Q 15/013

FOREIGN PATENT DOCUMENTS

| EP | 3124173 A1 | 2/2017 |
|----|------------|--------|
| EP | 3187290 A1 | 7/2017 |

(Continued)

OTHER PUBLICATIONS

Machine Translation of WO 2015/162739 A1 (Year: 2015).*

(Continued)

*Primary Examiner* — Ryan A Jarrett
(74) *Attorney, Agent, or Firm* — Kenja IP Law PC

(57) ABSTRACT

A machine tool includes: a cutting tool; rotating means; feeding means; vibrating means for reciprocatingly vibrating the cutting tool and the workpiece relative to each another; and amplitude control means for controlling the amplitude of the reciprocating vibration by the vibrating means. The cutting process is carried out by rotation of the workpiece and the cutting tool relative to each other and feeding of the cutting tool accompanied by the reciprocating vibration with said amplitude in the machining feeding direction of the cutting tool, to thereby move the cutting tool along a predetermined movement path relative to the workpiece. The movement path comprises a plurality of divisional paths divided at predetermined coordinate positions on the movement path. The amplitude control means is adapted to set the amplitude individually for each of the divisional paths.

2 Claims, 6 Drawing Sheets

(51) Int. Cl.
G05B 19/4093 (2006.01)
B23Q 17/12 (2006.01)
B23Q 17/22 (2006.01)

(56) References Cited

FOREIGN PATENT DOCUMENTS

| | | |
|---|---|---|
| JP | 5139591 B1 | 2/2013 |
| JP | 2016182655 A | 10/2016 |
| WO | 2015140906 A1 | 9/2015 |
| WO | 2015162739 A1 | 10/2015 |
| WO | 2016047485 A1 | 3/2016 |

OTHER PUBLICATIONS

Dec. 18, 2018, International Search Report issued in the International Patent Application No. PCT/JP2018/037284.
Jun. 18, 2021, the Extended European Search Report issued by the European Patent Office in the corresponding European Patent Application No. 18865848.8.
Apr. 14, 2020, International Preliminary Report on Patentability issued in the International Patent Application No. PCT/JP2018/037284.

\* cited by examiner

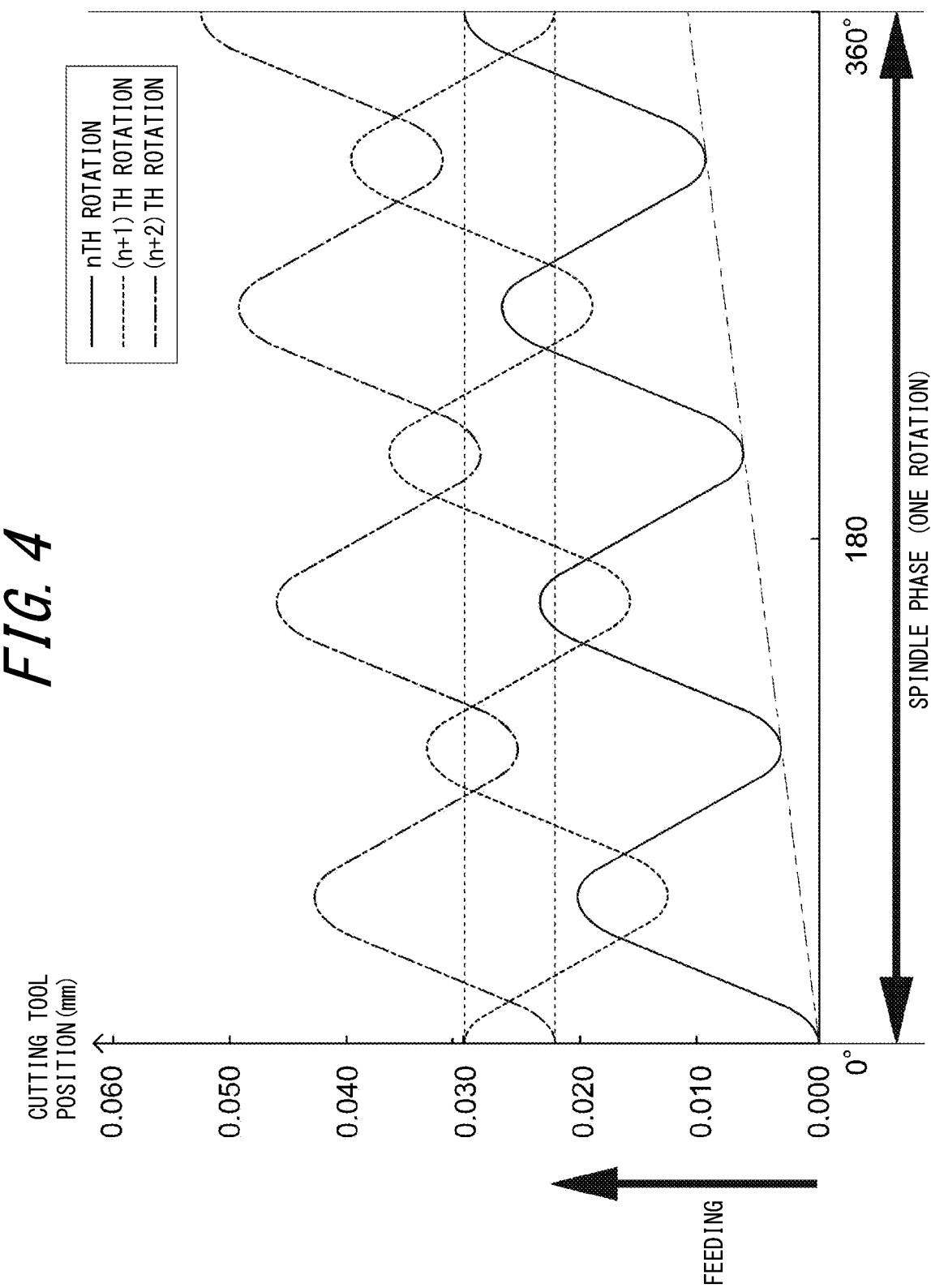

MACHINE TOOL

TECHNICAL FIELD

The present disclosure relates to a machine tool.

BACKGROUND ART

In the state of the art, there is known a machine tool that includes a cutting tool for cutting a workpiece, rotating means for relatively rotating the cutting tool and the workpiece, feeding means for feeding the cutting tool and the work in a predetermined machining feeding direction, vibration means for reciprocatingly vibrating the cutting tool and the workpiece relative to each other, and amplitude control means for controlling the amplitude of the reciprocating vibration by the vibration means, wherein the cutting process is carried out by rotation of the workpiece and the cutting tool relative to each other and feeding of the cutting tool involving the reciprocating vibration with said amplitude in the machining feeding direction of the cutting tool, to thereby move the cutting tool along a predetermined movement path relative to the workpiece (refer, for example, to WO 2016/047485 A1 (PTL 1)).

CITATION LIST

Patent Literature

PTL 1: WO 2016/047485 A1

SUMMARY

Technical Problem

It is an object of the present disclosure to provide a machine tool capable of freely setting the amplitude of the reciprocating vibration by the vibrating means within a predetermined movement path in which the cutting tool moves with relative to the workpiece when carrying out the cutting, and performing cutting accompanied by the vibration.

Solution to Problem

For solving the above-mentioned problems, according to the present disclosure, there is provided a machine tool that includes a cutting tool for cutting a workpiece; rotating means for rotating the cutting tool and the workpiece relative to each another, feeding means for feeding the cutting tool and the workpiece in a predetermined machining feeding direction, vibrating means for reciprocatingly vibrating the cutting tool and the workpiece relative to each another, and amplitude control means for controlling the amplitude of the reciprocating vibration by the vibrating means, wherein the cutting process is carried out by rotation of the workpiece and the cutting tool relative to each other and feeding of the cutting tool accompanied by the reciprocating vibration with said amplitude in the machining feeding direction of the cutting tool, to thereby move the cutting tool along a predetermined movement path relative to the workpiece, characterized in that the movement path comprises a plurality of divisional paths divided at predetermined coordinate positions on the movement path, and the amplitude control means is adapted to set the amplitude individually for each of the divisional paths.

In the machine tool of the present disclosure, with the abovementioned configuration, it is preferred that the movement path comprises an interpolation path based on a predetermined interpolation method between two predetermined coordinate positions.

In the machine tool of the present disclosure, with the abovementioned configuration, the two coordinate positions may include a movement starting position and an arrival position of the cutting tool, and the amplitude control means may gradually decrease the amplitude as the cutting tool moves to the arrival position.

Alternatively, the two coordinate positions may include a movement starting position and an arrival position of the cutting tool, and the amplitude control means may gradually increase the amplitude as the cutting tool moves to the arrival position.

Advantageous Effect

According to the structure of the machine tool of the present disclosure configured as described above, for carrying out the cutting process, the predetermined moving path along which the cutting tool moves relative to the workpiece is divided into a plurality of divided paths at predetermined coordinate positions on the moving path, and the amplitude of the reciprocating vibration by the vibrating means is individually set for each of the divided paths, to thereby achieve an advantageous effect that the amplitude in the moving path can be freely set to thereby ensure that the cutting process accompanied by the vibration can be easily carried out.

BRIEF DESCRIPTION OF THE DRAWINGS

In the accompanying drawings:

FIG. 4 illustrates the relationship of the $n^{th}$ rotation, $(n+1)^{th}$ rotation, and $(n+2)^{th}$ rotation of the spindle according to one embodiment of this disclosure.

DETAILED DESCRIPTION

Figure 1:
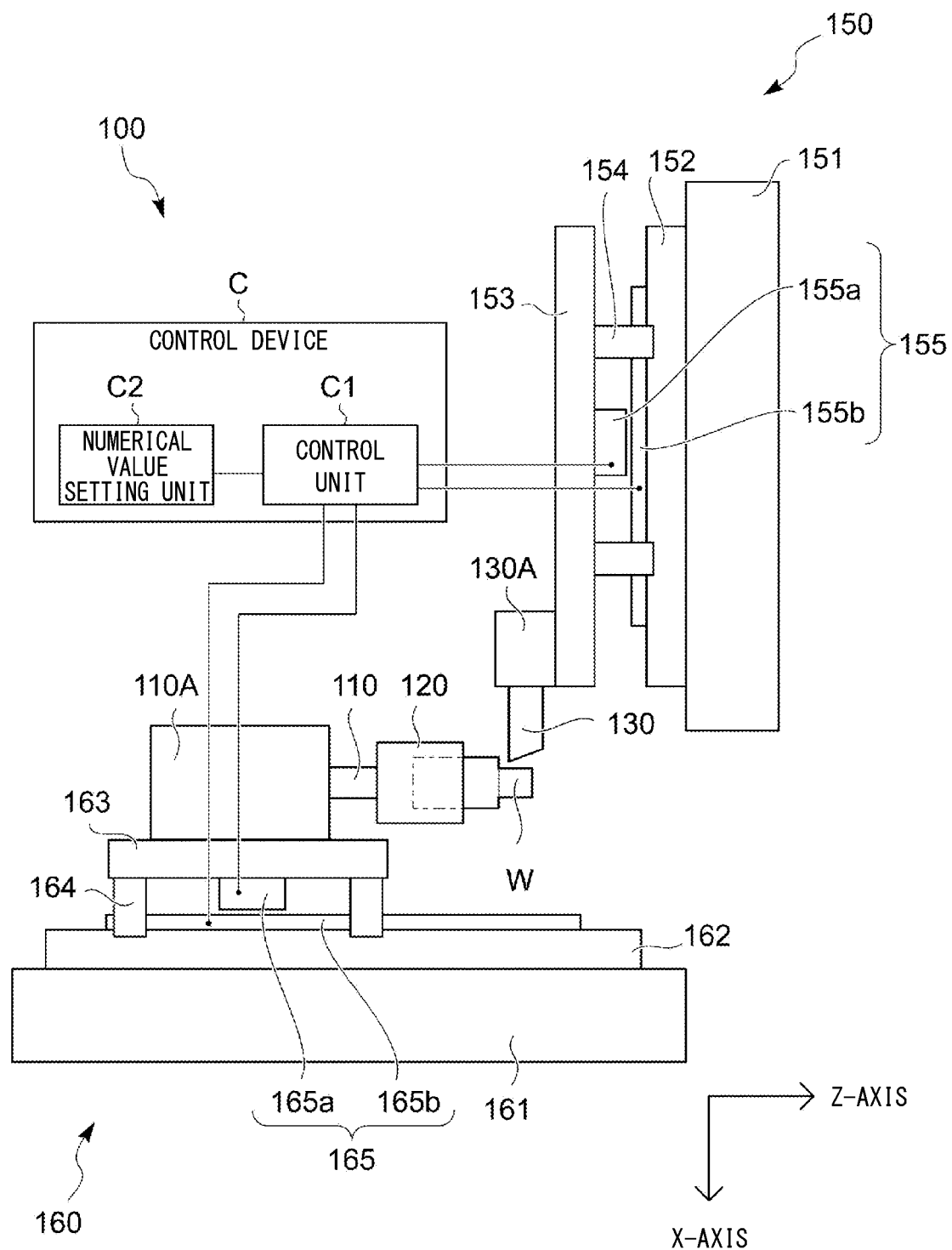
FIG. 1 illustrates the outline of the machine tool according to one embodiment of the present disclosure.

The machine tool 100 includes a spindle 110 and a cutting tool rest 130A, as illustrated in FIG. 1.

The spindle 110 has a tip provided with a chuck 120.

The spindle 110 is configured as a workpiece holder unit for holding a workpiece W, and the workpiece W is held on the spindle 110 via the chuck 120.

The cutting tool rest 130A is configured as a tool rest for holding a cutting tool 130, such as a cutting tool for turning a workpiece W, and the cutting tool 130 is mounted on the cutting tool rest 130A.

The spindle 110 is supported by a headstock 110A such that it can be driven for rotation by the power of a spindle motor.

The spindle motor may be in the form of a conventionally known built-in motor arranged between the headstock 110A and the spindle 110 in the headstock 110A.

The headstock 110A is mounted on the bed side of the machine tool 100 via a Z-axis direction feeding mechanism 160.

The Z-axis direction feeding mechanism 160 includes a base 161 integrated with the fixed side, such as the bed described above, of the Z-axis direction feeding mechanism 160, and a Z-axis guide rail 162 provided on the base 161 to extend in the Z-axis direction that is the axial direction of the spindle 110.

A Z-axis direction feeding table 163 is slidably supported on the Z-axis guide rail 162 via a Z-axis guide 164.

A mover 165a of a linear servomotor 165 is provided on the side of the Z-axis direction feeding table 163.

A stator 165b of the linear servomotor 165 is provided on the base 161 side.

By driving the linear servomotor 165, the Z-axis direction feeding table 163 is driven to move in the Z-axis direction.

The headstock 110A is mounted on the Z-axis direction feeding table 163.

By means of the movement of the Z-axis direction feeding table 163, the headstock 110A moves in the Z-axis direction to move the spindle 110 in the Z-axis direction.

The spindle 110 is provided integrally with the headstock 110A sand is movable in the Z-axis direction by a Z-axis direction feeding mechanism 160, such that the Z-axis direction feeding mechanism 160 moves the spindle 110 in the Z-axis direction as a spindle moving mechanism.

An X-axis direction feeding mechanism 150 is provided on the bed side of the machine tool 100.

The X-axis direction feeding mechanism 150 includes a base 151 integrated with the bed side, and an X-axis guide rail 152 vertically extending in the X-axis direction perpendicular to the Z-axis direction.

The X-axis guide rail 152 is fixed to the base 151, and an X-axis direction feeding table 153 is slidably supported on the X-axis guide rail 152 via an X-axis guide 154.

The cutting tool stand 130A is mounted on the X-axis direction feeding table 153.

A mover 155a of a linear servomotor 155 is provided on the X-axis direction feeding table 153 side.

A stator 155b of the linear servomotor 155 is provided on the base 151 side.

When the linear servomotor 155 is driven to move the X-axis direction feeding table 153 in the X-axis direction along the X-axis guide rail 152, the cutting tool base 130A is moved in the X-axis direction and the cutting tool 130 is thereby moved in the X-axis direction.

The X-axis direction feeding mechanism 150 serves as a tool rest moving mechanism for moving the cutting tool stand 130A in the X-axis direction integrally with the cutting tool 130.

The tool rest moving mechanism (the X-axis direction feeding mechanism 150) and the spindle moving mechanism (the Z-axis direction feeding mechanism 160) cooperate with each other such that, by means of the movement of the tool rest moving mechanism 130A (the cutting tool 130) by the X-axis direction feeding mechanism 150, in combination with the movement of the headstock 110A (the spindle 110) in the Z-axis direction by the Z-axis direction feeding mechanism 160, the cutting tool 130 is fed in any desired machining feeding direction relative to the workpiece W.

It is noted ted that there may be provided a Y-axis direction feeding mechanism for the Y-axis direction that is perpendicular to the Z-axis direction and the X-axis direction.

The Y-axis direction feeding mechanism may have a structure similar to the X-axis direction feeding mechanism 150.

The X-axis direction feeding mechanism 150 may be mounted on the bed via the Y-axis direction feeding mechanism, such that the Y-axis direction feeding table is moved in the Y-axis direction by driving a linear servomotor, and the cutting tool table 130A is moved in the Y-axis direction in addition to the X-axis direction, for moving the cutting tool 130 in the X-axis direction and the Y-axis direction.

In this instance, the tool rest moving mechanism is constituted by the X-axis direction feeding mechanism 150 and the Y-axis direction feeding mechanism, and the tool rest moving mechanism and the spindle moving mechanism cooperate with each other such that the cutting tool 130 mounted on the cutting tool rest 130A can be moved relative to the workpiece W in the Y-axis direction in addition to the X-axis direction and the Z-axis direction, and is relatively moved and fed in any desired machining feeding direction.

The Y-axis direction feeding mechanism may be mounted on the bed via the X-axis direction feeding mechanism 150, and the cutting tool table 130A may be mounted on the Y-axis direction feeding table.

Figure 2:
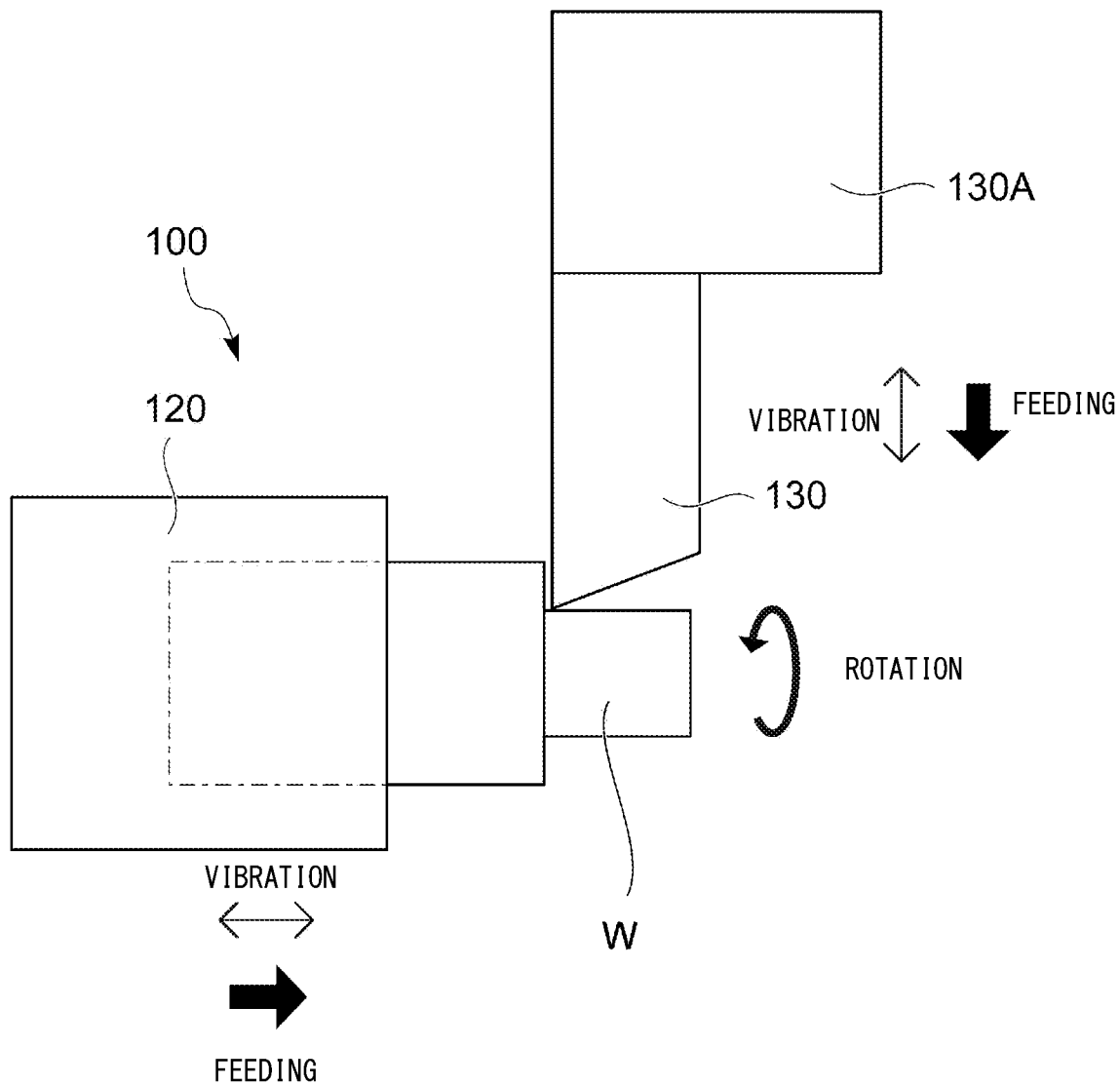
FIG. 2 illustrates the relationship between the cutting tool and the workpiece according to one embodiment of the present disclosure.

The spindle moving mechanism and the tool rest moving mechanism constitute a feeding means that serves to move the spindle 110 and the cutting tool rest 130A relative to each other, to move the cutting tool 130 in any desired cutting feed direction relative to the workpiece W, and to drive the spindle 110 as the rotating means for rotating the workpiece W and the cutting tool 130 relative to each other and thereby rotate the workpiece W relative to the cutting tool 130, such that the workpiece W can be machined by the cutting tool 130 into any desired shape, as illustrated in FIG. 2.

The present embodiment is configured such that both the headstock 110A and the cutting tool rest 130A are moved, though the headstock 110A may be fixedly secured to the bed side of the machine tool 100, and the tool rest moving mechanism may be configured to move the cutting tool table 130A in the X-axis direction, the Z-axis direction or the Y-axis direction.

In this instance, the feeding means is constituted by the tool rest moving mechanism for moving the cutting tool rest 130A in the X-axis direction, the Z-axis direction or the Y-axis direction, such that the cutting tool 130 carries out a free machining feeding operation relative to the workpiece W by moving the cutting tool table 130A.

The spindle moving mechanism may be configured such that the cutting tool rest 130A is fixedly secured to the bed side of the machine tool 100 and the headstock 110A is moved in the X-axis direction, the Z-axis direction or the Y-axis direction.

In this instance, the feeding means is constituted by the headstock moving mechanism for moving the headstock 110A in the X-axis direction, the Z-axis direction, or the Y-axis direction, and the spindle table 110A is moved relative to the fixedly positioned cutting tool table 130A such that the cutting tool 130 can be moved relative to the workpiece W and fed for machining.

In the present embodiment, the X-axis direction feed mechanism 150, the Y-axis direction feed mechanism, and the Z-axis direction feed mechanism 160 are configured to be driven by a linear servomotor, though the driving mechanism may be comprised of a ball-screw and a servomotor that are known, per se.

In the present embodiment, the rotating means for relatively rotating the workpiece W and the cutting tool 130 is comprised of a spindle motor in the form of a built-in motor or the like, and the relative rotation of the workpiece W and the cutting tool 130 is achieved by driving the spindle 110 for rotation.

The present embodiment is configured such that the workpiece W is rotated with respect to the cutting tool 130, though the configuration may be such that the cutting tool 130 is rotated with respect to the workpiece W.

In this instance, as the cutting tool 130, there may be used a rotary tool, such as a drill.

The rotation of the spindle 110, as well as the movement of the X-axis direction feeding mechanism 150, the Z-axis direction feeding mechanism 160 and the Y-axis direction feeding mechanism and the like, are controlled by a control device C.

The control device C includes a control unit C1 that serves to control the rotation of the spindle 110, the movement of the Z-axis direction feed mechanism 160, the X-axis direction feed mechanism 150 or the Y-axis direction feed mechanism.

The control unit C1 carries out the control such that each feed mechanism functions as a vibrating means and the headstock 110A or the cutting tool table 130A is moved in the respective direction while each feeding mechanism is reciprocatingly vibrated in the corresponding movement direction.

Figure 3:
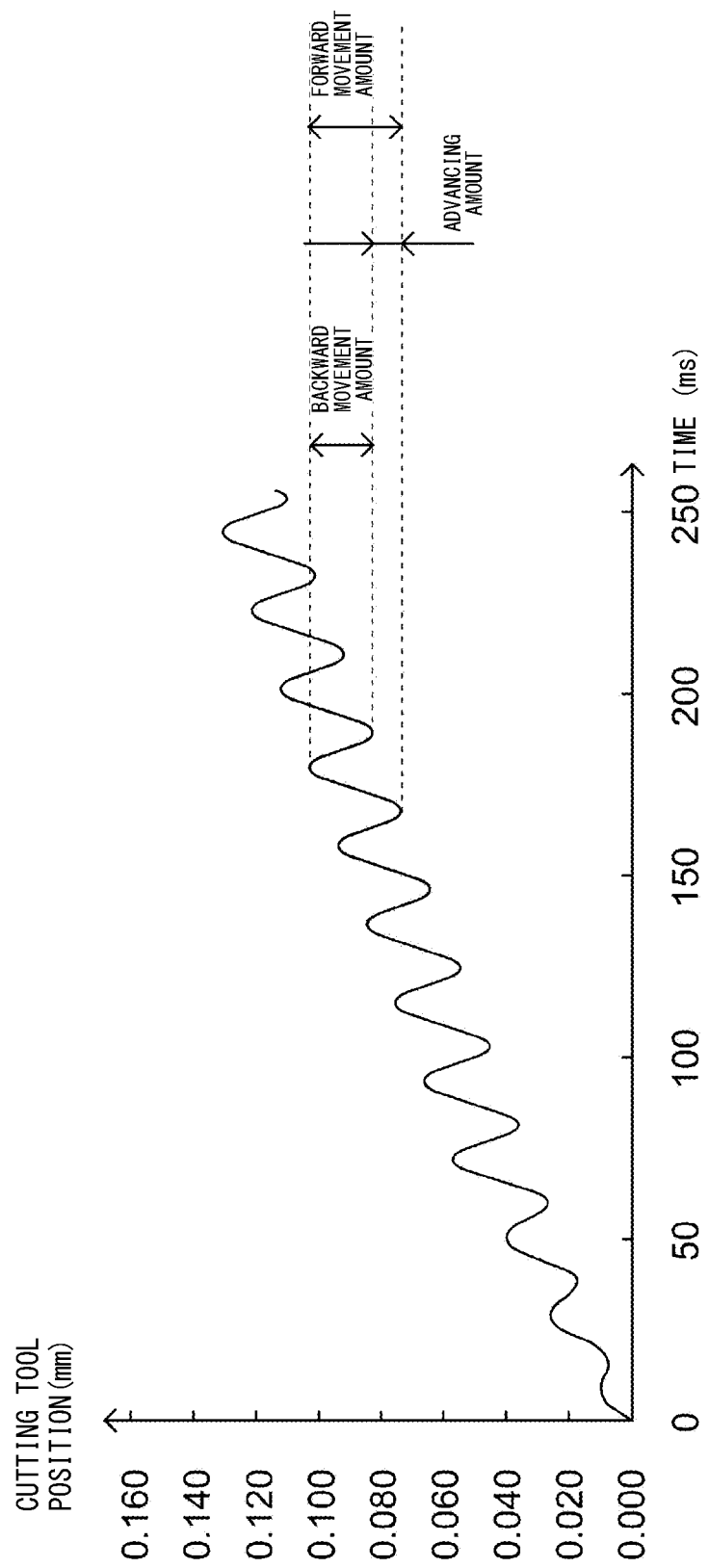
FIG. 3 illustrates the reciprocating vibration and the position of the cutting tool according to one embodiment of the present disclosure.

Under the control of the control unit C1, as illustrated in FIG. 3, each feed mechanism upon one reciprocating vibration cycle moves the spindle 110 or the cutting tool rest 130A forward by a predetermined forward movement amount (forward movement) and then backward by a predetermined backward movement amount (backward movement), thereby moving it by an advancing amount that is the difference between the forward movement amount and the backward movement amount.

By the cooperation of the respective feeding mechanisms under the control of the control unit C1, the feeding means causes the cutting tool 130 to reciprocatingly vibrate in the machining feeding direction relative to the workpiece W and moves and feed it in the machining feeding direction while advancing by a predetermined advancing amount.

The cutting tool 130 is fed by the feeding means in the machining feeding direction while reciprocatingly vibrating along the machining feeding direction such that the workpiece W is machined with the sum of the advancing amounts from 0° to 360° of the spindle phase angle as the feed amount.

By the feeding of the cutting tool 130 with the feeding means, for example, the workpiece W is subjected to machining into a predetermined shape and the outer peripheral surface of the workpiece W is thereby cut in a wavy shape as illustrated in FIG. 4.

As illustrated in FIG. 4, assuming that the number of vibrations of the cutting tool 130 per one rotation of the workpiece W is the vibration frequency N, if the vibration frequency N is 3.5 (the vibration frequency N=3.5), then the phase of the peripheral surface shape of the workpiece W turned by the cutting tool 130 at the $(n+1)^{th}$ rotation (n is an integer of 1 or more) is opposite to the phase of the shape turned by the cutting tool 130 at the $n^{th}$ rotation.

As a result, the cut portion upon the forward movement of the cutting tool 130 at the $n^{th}$ rotation and the cutting portion upon the backward movement at the $(n+1)^{th}$ rotation partially overlap.

Since the cut portion of the peripheral surface of the workpiece at the $(n+1)^{th}$ rotation includes a portion already cut at the $n^{th}$ rotation, the cutting tool 130 does not perform any cutting on the workpiece W during cutting in this portion thereby causing a swing-and-miss motion.

Chips generated from the workpiece W during the cutting process are sequentially broken by the above-mentioned swing-and-miss motion.

The machine tool 100 can smoothly carry out the outer shape cutting of the workpiece W while breaking the chips by the reciprocating vibration of the cutting tool 130 along the machining feeding direction.

When sequentially breaking chips by the reciprocating vibration of the cutting tool 130, what is necessary is only that the cut portion at the $(n+1)^{th}$ rotation on the peripheral surface of the workpiece includes a portion already cut at the $n^{th}$ rotation.

In other words, it is sufficient if the trajectory of the cutting tool 130 upon the backward movement at the $(n+1)^{th}$ rotation of the workpiece peripheral surface reaches the position of the trajectory of the cutting tool 130 at the $n^{th}$ rotation of the workpiece peripheral surface.

As illustrated in FIG. 4, the phases of the shapes to be turned by the cutting tool 130 on the workpiece W at the $(n+1)^{th}$ rotation and at the $n^{th}$ rotation should need not be the same (the same phase), and it is not always necessary for the phases to be inverted by 180°.

Figure 5A:
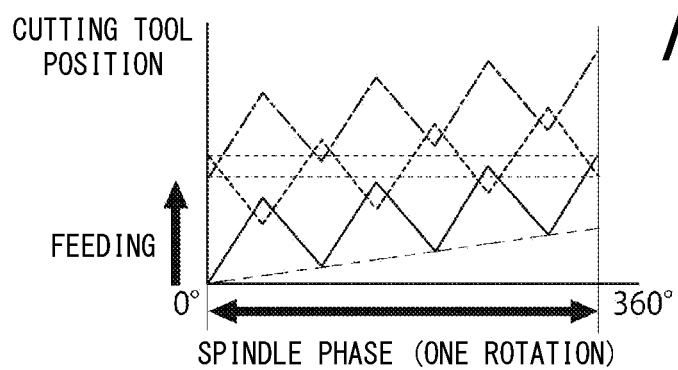
FIG. 5A illustrates the relationship between the feed amount and the amplitude according to one embodiment of the present disclosure.

As illustrated in FIG. 5A, similarly to FIG. 4, it is assumed that the cutting tool 130 vibrates 3.5 times per one rotation of the spindle, and the cutting portion at the time of the forward movement of the cutting tool 130 and the cutting portion at the time of the backward movement are partially overlapping such that the cut portion upon the second rotation of the peripheral surface of the workpiece W includes the portion already cut upon the first rotation and the swing-and-miss operation of the cutting tool 130 as described above takes place during the cutting. From this state, if the feeding amount is simply increased, as illustrated in FIG. 5B, the trajectory of the cutting tool 130 at the time of the backward movement in the $2^{nd}$ rotation does not reach the trajectory of the cutting tool 130 in the $1^{st}$ rotation, with the result that the chips may not be broken.

Figure 5B:
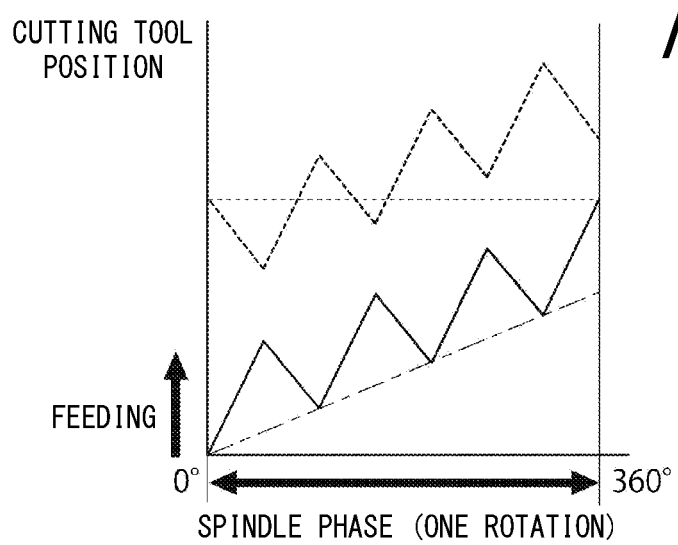
FIG. 5B illustrates the relationship between the feed amount and the amplitude according to one embodiment of the present disclosure.
Figure 5C:
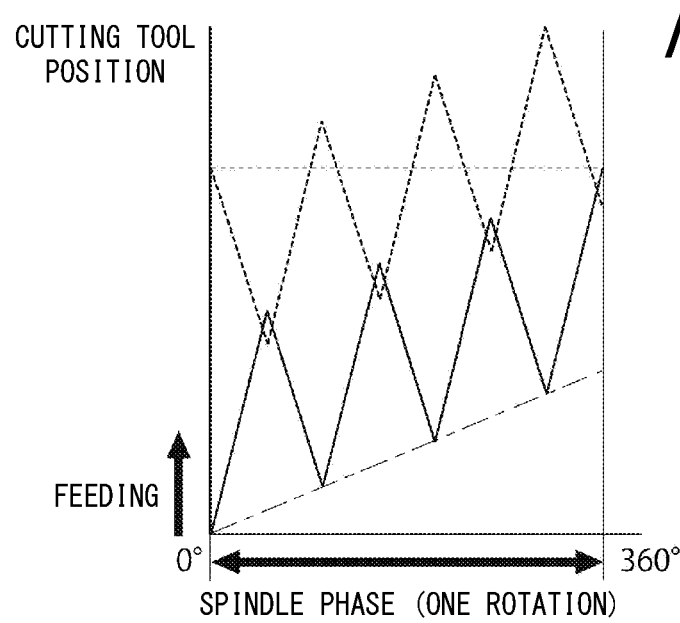
FIG. 5C illustrates the relationship between the feed amount and the amplitude according to one embodiment of the present disclosure.

In FIGS. 5A to 5C, the vibration of the cutting tool 130 is represented by straight lines for easy understanding.

If the feeding amount is simply gradually increased, the overlapping portion of the cutting portion of the cutting tool 130 at the time of the forward movement and the cutting portion of the cutting tool 130 at the time of the backward movement as described above gradually decreases.

Hence, there may be instances where the cutting portion at the time of the forward movement and the cutting portion at the time of the backward movement are not overlapped with each other, with the result that the swing-and-mis operation as described above cannot be performed with the result that the chips are not broken.

The control unit C1 includes an amplitude setting unit for setting the amplitude of the reciprocating vibration proportionally to the feeding amount of the cutting tool 130 relative to the workpiece W.

The amplitude setting means is configured to set the amplitude by multiplying the feeding amount by the amplitude feed ratio, with the ratio of the amplitude to the feeding amount as the amplitude/feeding ratio.

The amplitude/feeding ratio may be set in the control unit C1 by the user, via a numerical value setting unit C2 and the like.

The amplitude setting means and the vibration means cooperate with each other and, as illustrated in FIG. 5C, serves to set the reciprocating vibration of the cutting tool 130 along the machining feeding direction and the amplitude according to the feeding amount set for the cutting process. The control unit C1 thereby controls the vibrating means such that the trajectory of the cutting tool 130 at the time of the backward movement upon the second rotation of the workpiece W reaches the trajectory of the cutting tool 130 upon the first rotation of the workpiece W.

As a result, the amplitude is set according to the feeding amount, and the vibrating means vibrates the cutting tool 130 so as to cause the above-described swing-and-miss operation under the control of the control unit C1, thereby breaking the chips.

The cutting by the feeding of the cutting tool 130 is carried out by providing a moving instruction to the control unit C1 for moving the cutting tool 130 to a predetermined coordinate position.

For example, the cutting tool 130 located at a predetermined coordinate position with respect to the workpiece W, i.e., the movement starting position, may be moved to a coordinate position designated by the moving instruction as the arrival position along an interpolation path based on the predetermined interpolation method as the moving path. In this instance, the cutting tool 130 is fed along a path connecting the two coordinate positions by the interpolation path such that the workpiece W is cut into a shape connecting the two coordinate positions by the interpolation path.

Thus, if the cutting tool 130 is moved between the two coordinate positions along a linear interpolation path, then the workpiece W is machined into a linear shape between the two coordinate positions.

On the other hand, if the cutting tool 130 is moved between the two coordinate positions along an arcuate interpolation path having a predetermined radius, then the workpiece W is machined into an arcuate shape between the two coordinate positions.

The control unit C1 according to the present embodiment includes a path dividing means and an amplitude control means.

The path dividing means serves to divide the interpolation path into a plurality of divisional paths at predetermined coordinate positions on the interpolation path, along which the cutting tool 130 moves to the coordinate position specified by the movement instruction.

Figure 6:
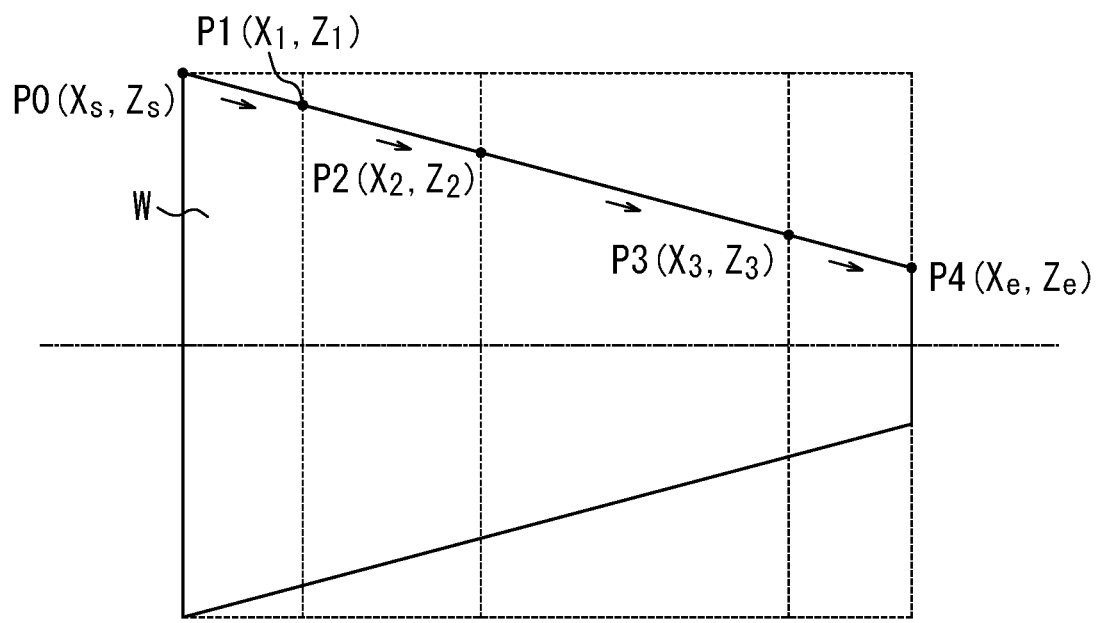
FIG. 6 illustrates one example of the interpolation path divided into a plurality of divisional paths.

For example, as illustrated in FIG. 6, assuming that the cutting tool 130 located at a coordinate position P0 (Xs, Zs) is moved to P4 (Xe, Ze) along a linear interpolation path, and coordinate positions P1 (X1, Z1), P2 (X2, Z2), and P3 (X3, Z3) are located on the interpolation path, the path dividing means divides the interpolation path into a first divisional path from P0 (Xs, Zs) to P1 (X1, Z1), a second divisional path from P1 (X1, Z1) to P2 (X2, Z2), a third divisional path from P2 (X2, Z2) to P3 (X3, Z3), and a fourth divisional path from P3 (X3, Z3) to P4 (Xe, Ze).

The amplitude control means serves to set the amplitude of the reciprocating vibration separately for each divided path.

The control unit C1 moves the cutting tool 130 in the first divisional path along a straight line serving as the interpolation path while subjecting the cutting tool 130 to a reciprocating vibration at a predetermined amplitude D1 as determined by the amplitude control means, in the second divisional path along a straight line serving as the interpolation path while subjecting the cutting tool 130 to a reciprocating vibration at a predetermined amplitude D2 as determined by the amplitude control means, in the third divisional path along a straight line serving as the interpolation path while subjecting the cutting tool 130 to a reciprocating vibration at a predetermined amplitude D3 as determined by the amplitude control means, and in the fourth divisional path along a straight line serving as the interpolation path while subjecting the cutting tool 130 to a reciprocating vibration at a predetermined amplitude D4 as determined by the amplitude control means.

Since the movement path in each divisional path overlaps the interpolation path, the cutting tool 130 is moved from P0 (Xs, Zs) to P4 (Xe, Ze) along a linear interpolation path while being subjected to reciprocating vibration.

Furthermore, since each amplitude for each divisional path is set individually, for example, as the cutting tool 130 is moved from the movement starting position to the arrival position, each amplitude may be set to be sequentially smaller.

For example, the amplitude may be sequentially reduced from the amplitude D1 to the amplitude D4, or the amplitude may be sequentially increased from the amplitude D1 to the amplitude D2 and then, after an amplitude determined by the amplitude setting means has been reached, the amplitude D3 or the amplitude D4 may be sequentially reduced as compared with the amplitude D2, or the amplitude D4 may be made smaller than the amplitude D3.

By decreasing the amplitude of the reciprocating vibration sequentially from the first divisional path to the fourth divisional path, cutting can be carried out such that the position of the cutting tool 130 at the time of switching from the forward movement to the backward movement upon the reciprocating vibration in the fourth divisional path coincides with the arrival position as described above.

Upon completion of the cutting along the fourth divisional path, the reciprocating vibration is stopped for cutting the workpiece W while maintaining the cutting tool 130 at the arrival position.

This makes it possible to prepare a cut surface at the position where the workpiece W has reached.

The amplitude control means can set each amplitude in each divisional path by individually setting the amplitude/feeding ratio for each divisional path.

The amplitude control means can individually set each amplitude in each divisional path, for example, by multiplying the amplitude feeding ratio set for the amplitude setting means by a predetermined constant for each divisional path.

However, if the amplitude/feeding ratio is simply reduced sequentially, there may be instances where the overlapping portion between the cutting portion at the time of the forward movement and the cutting portion at the time of the backward movement of the cutting tool 130 described above becomes small, and the cutting portions at the time of the forward movement and the backward movement do not overlap with time, with the result that the above-mentioned swing-and-miss operation cannot be performed with the result that chips are not broken. Therefore, the amplitude control means may be configured to determine the feeding amount for each divided path and set different feeding amounts, in order that each amplitude in each divisional path is set individually.

This makes it possible to sequentially reduce the amplitude while breaking the chips in each of the divisional paths.

The amplitudes of some divisional paths may have the same magnitude.

Further, if the position of the cutting tool 130 at the time of switching from the forward movement to the backward movement cannot be matched with the arrival position, the reciprocating vibration may be stopped in a state where the position of the cutting tool 130 when switching from the forward movement to the backward movement does not exceed the arrival position, but is located close to the arrival position, such that the cutting tool is moved to the arrival position without causing the reciprocating vibration.

The stopping of the reciprocating vibration may be carried out, for example, by setting the amplitude/feeding ratio to zero.

By setting the amplitude/feeding ratio to zero or the like, the divisional interpolation paths may be set for carrying out cutting with the reciprocating vibration stopped.

The amplitude control means may be configured to sequentially increase the amplitudes as the cutting tool 130 moves from the movement starting position to the arrival position. For example, the amplitude may be sequentially increased from the amplitude D1 to the amplitude D4, or the amplitude D2 or the amplitude D3 may be sequentially increased from the amplitude D1 to an amplitude as determined by the amplitude setting means. By setting the amplitude such that it is sequentially increased from the amplitude D1 to the amplitude D4, it is possible to reduce the amplitude D1 at the movement starting position (cutting starting position) and thereby reduce the load on the cutting tool 130 at the starting of cutting.

The path dividing unit may be configured to divide the interpolation path into a plurality of divided paths based on a predetermined time. For example, the interpolation path may be divided into a first divisional path consisting of a section after the cutting tool 130 starts moving from the movement starting position and until a predetermined time elapses, a second divisional path consisting of a section after the first divisional path and until a predetermined time elapses, a third divisional path consisting of a section after the second divisional path and until a predetermined time elapses, and a fourth divisional path consisting of a section after the third divisional path and until the arrival position is reached.

As in the above-described embodiment, by setting the amplitude/feeding ratio and the feeding amount separately for each divisional path, each amplitude in each divisional path may be set individually. For example, as the cutting tool 130 is moved from the movement starting position to the arrival position, the amplitude D1 in the first divisional path may be sequentially reduced from the amplitude D4 in the fourth divisional path, or the amplitude may be sequentially increased from the amplitude D1 to the amplitude D2 and then, after an amplitude determined by the amplitude setting means has been reached, the amplitude D3 in the third divisional path and the amplitude D4 may be sequentially reduced as compared with the amplitude D2, or the amplitude D4 may be made smaller than the amplitude D3.

The invention claimed is:

1. A machine tool comprising: a cutting tool for cutting a workpiece; rotating means for rotating the cutting tool and the workpiece relative to each other; feeding means for feeding the cutting tool and the workpiece in a predetermined machining feeding direction; vibrating means for reciprocatingly vibrating the cutting tool and the workpiece relative to each other; and amplitude control means for controlling an amplitude of the reciprocating vibration by the vibrating means, wherein:

the cutting process is carried out by rotation of the workpiece and the cutting tool relative to each other and feeding of the cutting tool accompanied by the reciprocating vibration with said amplitude in the machining feeding direction of the cutting tool, to thereby move the cutting tool along a predetermined movement path relative to the workpiece;

wherein the amplitude control means is configured to control the amplitude separately for each divided paths divided at predetermined coordinate positions on the moving path, wherein the movement path includes an interpolation path between two predetermined coordinate positions, based on a predetermined interpolation method, and wherein the two coordinate positions include a movement starting position and an arrival position of the cutting tool, and the amplitude control means is configured to set the amplitude to gradually decrease as the cutting tool moves to the arrival position.

2. A machine tool comprising: a cutting tool for cutting a workpiece; rotating means for rotating the cutting tool and the workpiece relative to each other; feeding means for feeding the cutting tool and the workpiece in a predetermined machining feeding direction; vibrating means for reciprocatingly vibrating the cutting tool and the workpiece relative to each other; and amplitude control means for controlling an amplitude of the reciprocating vibration by the vibrating means, wherein:

the cutting process is carried out by rotation of the workpiece and the cutting tool relative to each other and feeding of the cutting tool accompanied by the reciprocating vibration with said amplitude in the machining feeding direction of the cutting tool, to thereby move the cutting tool along a predetermined movement path relative to the workpiece;

wherein the amplitude control means is configured to control the amplitude separately for each divided paths divided at predetermined coordinate positions on the moving path, wherein the movement path includes an interpolation path between two predetermined coordinate positions, based on a predetermined interpolation method, and wherein the two coordinate positions include a movement starting position and an arrival position of the cutting tool, and the amplitude control means is configured to set the amplitude to gradually increase as the cutting tool moves to the arrival position.

* * * * *